United States Patent Office 3,207,182
Patented Sept. 21, 1965

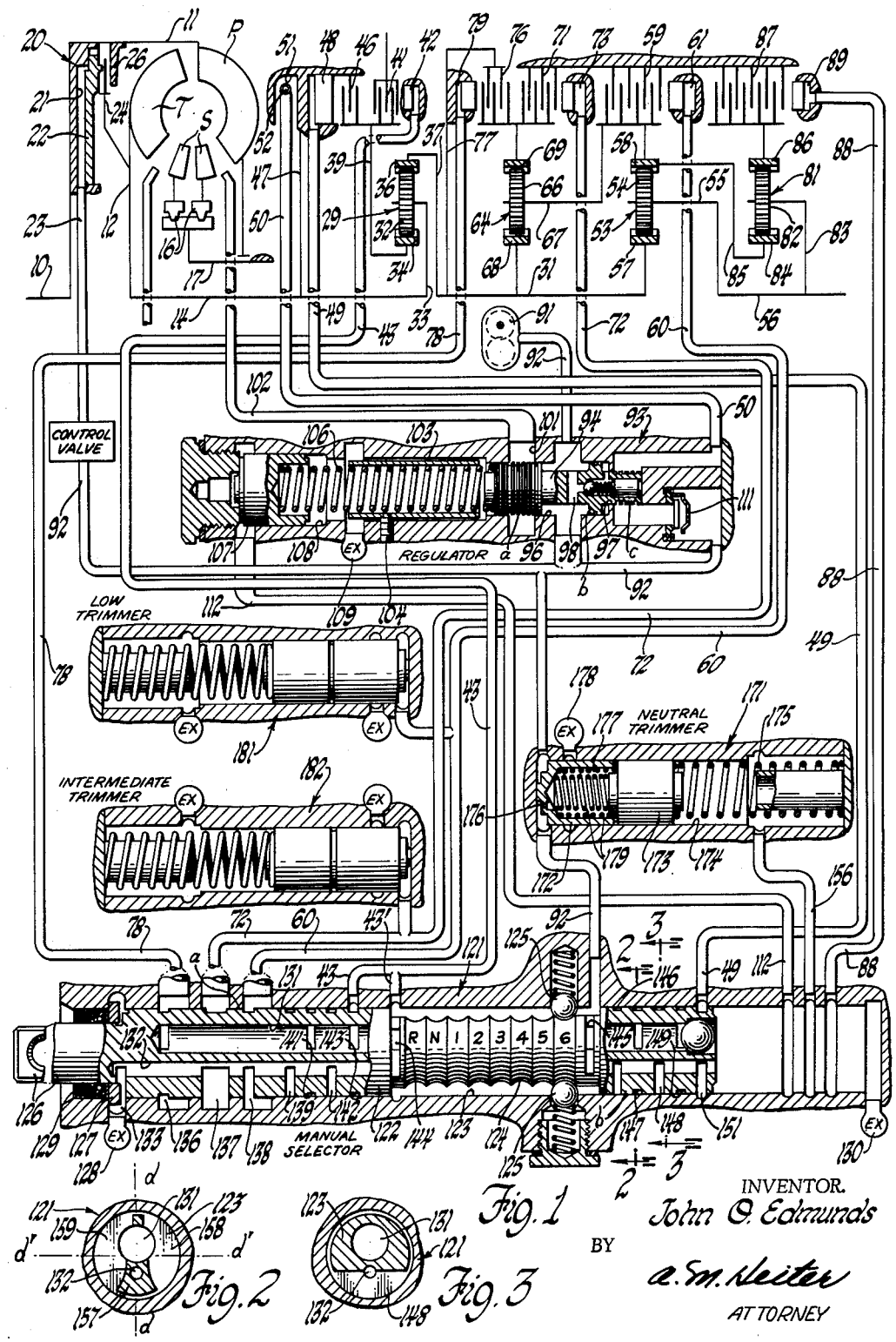

3,207,182
MANUAL VALVE
John O. Edmunds, Indianapolis, Ind., assignor to General Motors Corporation, Detroit, Mich., a corporation of Delaware
Filed Aug. 20, 1963, Ser. No. 303,328
6 Claims. (Cl. 137—625.68)

This invention relates to transmissions and particularly a fluid control system for controlling transmissions.

In fluid operated power shifting transmissions having a plurality of fluid actuated ratio engaging devices a manually operated shift valve is employed to selectively connect a source of fluid under pressure to selected fluid operated ratio engaging devices. When manual valves having an axially extending high pressure bore connected to a plurality of high pressure ports are employed, it has been found that the unbalanced axial force due to the high pressure acting on the side walls of the ports will bend the valve so that it binds in the bore. To correct this problem, the high pressure ports are formed with equal areas on opposite sides of a diameter of the valves and preferably substantially equal areas in each quarter so that these forces are substantially balanced to reduce the bending moment produced by these forces sufficiently to eliminate deflection. The control system also provides on a shift from neutral to either forward or reverse drive a reduction and subsequent gradual increase of line pressure for smooth drive engagement. The trimmer valve functions in response to the drop in line pressure during initial filling of the fluid actuated ratio engaging devices to provide a timed gradual pressure increase for smooth engagement. Similar trimmer valves may also be provided in the lines to other ratio engaging devices, such as the ones for low and intermediate ratio.

An object of the invention is to provide in a transmission having a plurality of fluid operated ratio engaging devices, a manual valve having a plurality of pressure and exhaust ports for selectively connecting a source of fluid pressure to selected ratio engaging devices to provide a plurality of ratio drives wherein the pressure ports have substantially balanced side wall areas so that the forces due to the fluid pressure therein have substantially no moment to cause bending of the valve element.

Another object of the invention is to provide in a valve structure having an axial bore therein and a plurality of pressure ports connected to the bore wherein each pressure port has substantially balanced side wall areas so that the forces resulting from the action of the pressure on the side walls of the port are substantially balanced and have insufficient moment to bend the valve.

These and other objects of the invention will be more apparent from the following description and drawing of a preferred embodiment of the invention.

FIGURE 1 is a diagrammatic view of a transmission.
FIGURE 2 is a section on the line 2—2 of FIGURE 1.
FIGURE 3 is a section on the line 3—3 of FIGURE 1.

The invention is illustrated in a transmission providing six forward speeds and reverse having an input shaft 10 driving a rotary torque converter housing 11. The torque converter has a pump P mounted on the housing 11, a turbine T connected by a hub 12 to the torque converter output shaft 14 and stators S connected by one-way devices 16 to a ground sleeve 17 secured to the transmission housing. The torque converter pump circulates fluid through the turbine to drive the turbine and torque converter output shaft 14 and through the stators to enter the pump all in the conventional manner of torque converters.

The lockup clutch 20 has a fluid motor having a cylinder 21 in which the piston 22 is located. On the supply of fluid via lockup clutch line 23 to the cylinder 21, the piston 22 moves to engage the driven plate 24 which is connected to the hub 12 and torque converter output shaft 14 between the piston 22 and abutment plate 26 which is fixed to the housing 11 for lockup drive. The piston 22 is provided with suitable pins (not shown) engaging the cylinder to prevent rotation relative to the cylinder which is fixed on the rotary housing 11. Also suitable retraction springs, not shown, or the fluid pressure in the torque converter housing 11 may be employed to return the piston 22 to disengage the lockup clutch.

The torque converter output shaft 14 is connected by the splitter planetary gear unit 29 to drive the intermediate shaft 31 at a low direct drive ratio or a high overdrive ratio. The splitter gear unit 29 has planetary pinions 32 mounted on a carrier 33 fixed to the torque converter output shaft 14 and meshing with a sun gear 34 and a ring gear 36 connected by a hub 37 to intermediate shaft 31. The sun gear 34 is connected by a hub 39 to the multiplate brake 41 which is actuated by fluid motor 42 on the supply of fluid via splitter high line 43 to provide splitter high drive. The hub 39 is also connected by the multiplate clutch 46 to the hub 47 to the output shaft 14. The clutch 46 is engaged by a fluid motor 48 on the supply of fluid by the splitter low line 49 for low direct drive.

The pilot governor has an annular chamber 51 suitably supplied with fluid from the transmission lubrication or control system mounted for rotation with the hub 47 and a pitot tube 52 located in the chamber to supply governor pressure proportional to rotation of the shaft 14 to the governor line 50.

The intermediate shaft drives the low planetary gear set 53 which has a plurality of pinions 54 mounted on the carrier 55 connected to drive the output shaft 56. The pinions mesh with the sun gear 57 driven by intermediate shaft 31 and ring gear 58 which may be retarded by the multiplate brake 59 on the supply of fluid via low ratio line 60 to the fluid motor 61, to provide low ratio in the rear unit.

The intermediate planetary gear set 64 has a plurality of planetary pinions 66 mounted on a carrier 67 connected to the low ring gear 58. The pinions mesh with a sun gear 68 driven by intermediate shaft 31 and a ring gear 69 retarded by brake 71 on the supply of fluid via intermediate ratio line 72 to the fluid motor 73 for intermediate ratio.

High ratio or direct drive is provided by a clutch 76 having one set of plates connected to the ring gear 69 and another set of plates connected by the hub 77 to the intermediate shaft 31 to lock up the rear unit planetary gear sets. On the supply of fluid via high ratio line 78 to the motor 79 to engage clutch 76, the gear unit is locked up for direct drive or high ratio.

The reverse planetary gear set 81 has a plurality of planetary pinions 82 mounted on a carrier 83 driving output shaft 56. The pinions also mesh with a sun gear 84 connected by a hub 85 to ring gear 58 and mesh with ring gear 86 which may be retarded by the multiplate brake 87 on the supply of fluid via reverse line 88 to the fluid motor 89.

The six forward drive ratios are provided by using either splitter low or high with low, intermediate or high of the rear unit. First and second ratios are provided by engaging low ratio gear set 53 in conjunction with splitter low or splitter high drive, respectively, of the front unit. The third and fourth ratios are similarly provided by engaging intermediate with either splitter low or splitter high. The fifth and sixth ratios are provided by engaging high or direct drive in the rear unit and either splitter low or splitter high, respectively. In reverse, though two ratios may be provided, only one is provided since the controls are arranged to engage the reverse gear set 81 and splitter low.

Hydraulic controls

Fluid pressure for the hydraulic control system is supplied by an input driven pump 91 to the main line 92 which is regulated by the main line regulator valve 93. The main line regulator valve element 94 has lands $a$ and $b$ of equal diameter located in a bore 96 and a smaller diameter land $c$ located in the smaller bore 97. Fluid pressure from the main line 92 passes through the passage 98 which has a check valve therein permitting full flow into the passage and restricted flow out of the passage to permit a damped supply of fluid to act on the land $b$ to move the valve element 94 to the exhaust position connecting main line 92 to exhaust port 101 which is connected by converter supply line 102 to supply fluid to the torque converter operating chamber. Movement of the valve element in this direction is limited by a sleeve 103 positioned by pin 104. A spring 106 biases the valve element 94 to the closed position shown. The spring abuts a movable abutment piston 107 mounted in a suitable limited length cylinder portion 108. Exhaust 109 vents the spring chamber. Governor pressure via line 50 is connected to act on the land $c$ to reduce line pressure with increasing governor pressure until governor pressure reaches line pressure where the governor pressure is limited by the opening of check valve 111 to exhaust governor pressure line 50 to main line 92. The signal line 112 supplies fluid in certain shift positions to cylinder 108 to move the piston 107 to increase the spring biasing force and line pressure in first and reverse positions of the manual shift valve.

The manual valve 121 has a valve element 122 having lands $a$ and $b$ located in a bore 123 for reciprocal movement to the reverse, neutral and first through sixth ratio positions. The valve positioning grooves 124 are designated as R, N, 1, 2, 3, 4, 5 and 6. The valve is located in the corresponding position when the ball detents 125 engage the respective grooves. The valve element 122 has a reduced actuating portion 126 extending through a C washer 127 located in the exhaust port 128 which engages the shoulder of land $a$ to limit movement of the valve. The seal 129 prevents leakage of fluid beyond exhaust 128. Valve element 122 has a high pressure bore 131 which is closed at both ends and a low pressure or exhaust bore 132 which is open at both ends. At the actuating end it is opened via the exhaust port 133 and at the other end it is directly opened at the end face of the valve element 122. The bore in the body is exhausted at the ends by exhaust ports 128 and 130. The valve element also has a plurality of high pressure ports having a section as shown in FIGURE 2, and exhaust ports having a section as shown in FIGURE 3. Enumerating from the operating end, there is a high pressure supply port 136, a wide exhaust port 137, an exhaust port 138, an exhaust port 139, a supply port 141, an exhaust port 142 and a supply port 143 all in land $a$. Between the land $a$ and the reverse groove there is a supply port 144. Between groove 6 and land $d$ there is a supply port 145. Continuing in land $d$ there is an exhaust port 146, a supply port 147, an exhaust port 148, a supply port 149 and a low exhaust port 151. The ports in the valve body are referred to by the same numeral as the connecting line. Note that the ports of lines 60, 72 and 78 are double width ports to provide connections in two successive valve positions.

In all valve positions, the main line 92 is connected via port 145 to the space between lands $a$ and $b$, the supply bore 131 and the connected supply ports.

In the sixth ratio position shown, main line 92 is connected via bore 123 and branch line 43' to line 43 to engage high in the splitter unit, and via supply port 145, bore 131 and supply port 136 to line 78 to engage the high ratio in the rear unit. In fifth ratio position, with the detent balls engaging groove 5, line 78 for high ratio in the rear unit remains connected as described above, and the supply port 149 is connected to supply line 49 to engage low ratio in the splitter unit. In fourth ratio, the supply port 136 supplies line 72 to engage intermediate ratio in the rear unit and supply ports 141 and 143 are connected, respectively, to lines 43 and 43' to engage splitter high. In third ratio, the connection to intermediate line 72 remains the same and supply port 147 is connected to line 49 to engage splitter low. For second ratio, supply port 136 is connected to supply line 60 to engage low ratio in the rear unit and fluid is supplied via supply port 141, branch 43' and line 43 to engage splitter high. In first ratio the connection to rear unit low ratio remains the same and the main line 92 is connected by the space between the lands $a$ and $b$ to line 49 to engage splitter low and also by supply port 149 to signal line 112. In neutral, fluid is connected by the space between the lands $a$ and $b$ to the splitter low line 49 and by the supply port 149 to the signal line 156. In reverse, splitter low remains engaged as in neutral and first ratio, and supply port 149 is connected to reverse line 88 to engage reverse, and supply port 147 is connected to signal line 112 to boost main line pressure. In each of the above valve positions the other lines are connected via exhaust ports to the exhaust bore 132 to exhaust.

Each of the high pressure supply ports is constructed as shown in FIGURE 2. The section 157 of the valve element 123 at each supply port is made substantially symmetrical about the diameter $dd$ extending through the axis of both ports so that the side wall areas of the ports 158 and 159 are balanced about diameter $dd$. These areas are also substantially balanced about the diameter $d'd'$ at right angles to diameter $dd$. It should be noted that the areas of the above section are reduced by both the valve element section and the cross section area of bore 131. Since the valve section has material at both ends of diameter $dd$ the area balance about diameter $d'd'$ is not so critical since a small unbalance which produces no deflection can be tolerated. The present form in which the areas are balanced or substantially balanced about the diameter between the grooves and substantially balanced about the diameter at right angles thereto so that the fluid pressure forces cause no deflection and do not bend the valve element provides a design suitable for mass production, since it permits a cutting, milling or grinding, operation employing a rotary tool to form the grooves.

All the exhaust sections are as shown in FIGURE 3 and may have an unbalanced side wall area for the exhaust port since the low pressure would not provide any bending moment. High pressure supply ports made in this manner are unsatisfactory.

The trimmer valve 171 has a valve element 172, a valve plug 173 located in the bore 173 biased by a spring 175 to the closed position shown. Pressure supplied by signal line 156 holds the valve 171 in the closed position shown preventing regulation of main line pressure. On exhaust of signal line 156, main line pressure in line 92 bleeds slowly through the orifice 176 in valve element 172 to the chamber 177 between the valve element and plug 173 to balance the pressure on valve element 172 and permit springs 179 to gradually separate the valve element and valve plug. Main line pressure initially acts against the spring 175 to move the valve element 172 and plug 173 to exhaust 178 to regulate the line pressure at a low value, and then as the fluid bleeding through orifice 176 separates the valve element and valve plug, gradually regulate the pressure at higher values until the main line pressure value is reached. At this time the valve ceases to regulate.

The low trimmer valve 181 is similarly constructed and connected to the low pressure line 60 to regulate the pressure on initial application to the low motor 61. The intermediate trimmer valve 182 is also constructed in this manner and connected to the intermediate line 72 to regulate the pressure to provide a gradually increasing pressure to the intermediate motor 73 for smooth ratio engagement.

Since fluid is supplied to signal line 156 only in neutral, the trimmer valve 171 is operative only on the shift of the manual valve from neutral to either first or reverse and is thereafter inoperative to trim shifts between ratios. In neutral, full line pressure is provided. During the engagement of first and reverse motors 61 and 89 the fluid pressure supplied thereto is reduced due to the flow to fill the motors and then is gradually increased.

The main line 72 is also connected through a suitable lockup clutch control valve or valves, as shown in the Christenson et al. Patent 3,053,116 or Tuck et al. 2,978,928, to lockup clutch line 23 to actuate the lockup clutch.

The invention may be modified in accordance with the scope of the appended claims:

I claim:
1. In a valve;
  (a) a valve body having a long cylindrical valve bore with a fluid supply port, an exhaust port and a controlled port;
  (b) a long cylindrical valve element reciprocally mounted for movement to a plurality of positions in said bore and having spaced lands and an intermediate portion of reduced diameter;
  (c) said valve element having a supply bore closed at both ends and an exhaust bore connected to said exhaust port in said bore and both said supply and exhaust bores extending through a land and said supply and exhaust bores having axes substantially intersecting a first diameter of said valve element;
  (d) said supply port in said bore being located between said lands in all valve positions;
  (e) a supply passage in said valve element connecting said supply bore through the valve element in said intermediate portion to connect said supply bore to said supply port in said body in all valve positions;
  (f) an annular supply port formed as a groove in said land of said valve element connected to said supply bore located in said land to provide a selective connection to said controlled port in said body and the supply port in said valve element having substantially balanced areas located on opposite sides of said first diameter through the axis of said supply and exhaust bores and substantially balanced areas on opposite sides of a second diameter located perpendicular to said first diameter to substantially balance the forces due to fluid pressure in said supply port of said valve element;
  (g) said valve element at said supply port having a section with material located along said first diameter between each of said supply and exhaust bores and the perimeter to provide a high moment section to prevent deflection;
  (h) and an exhaust port in said valve element connected to said exhaust bore and selectively connecting said control port to exhaust.

2. In a valve assembly;
  (a) a valve body having a long cylindrical bore with a fluid supply port, an exhaust port at each end and a plurality of controlled ports;
  (b) a long cylindrical valve element reciprocally mounted for movement to a plurality of positions in said bore and having spaced lands and an intermediate portion of reduced diameter having a plurality of grooves;
  (c) detent means mounted on said body engaging said grooves to resiliently retain said valve element in each of said plurality of positions;
  (d) said valve element having a supply bore closed at both ends and an exhaust bore having exhaust passages at both ends connected at each end to said exhaust ports in said bore and both said supply and exhaust bores extending through both said lands and intermediate portion and said supply and exhaust bores having axes substantially intersecting a first diameter of said valve element;
  (e) said supply port in said bore being located between said lands in all valve positions;
  (f) a supply passage in said valve element connecting said supply bore through the valve element in said intermediate portion to connect said supply bore to said supply port in said body in all valve positions;
  (g) a plurality of supply ports formed as annular grooves in said lands of said valve element connected to said supply bore to provide selective connections to pairs of said controlled ports in said body and each supply port in said valve element having substantially balanced areas located on opposite sides of said first diameter through the axis of said supply an exhaust bores and substantially balanced areas on opposite sides of a second diameter located perpendicular to said first diameter to balance the forces due to fluid pressure in said supply ports of said valve element;
  (h) said valve element at said supply ports having a section with material located along said first diameter between each of said supply and exhaust bores and the perimeter to provide a strong section to prevent any deflection;
  (i) and exhaust ports in said valve element connected to said exhaust bore and selectively connecting said controlled ports, other than the pair connected to supply ports in said valve element, to exhaust in each selected valve position.

3. In a valve assembly;
  (a) a valve body having a bore with a plurality of controlled ports;
  (b) a valve element reciprocally mounted for movement to a plurality of positions in said bore;
  (c) said valve element having a supply bore closed at both ends and an exhaust bore;
  (d) said valve body and element having supply means for supplying fluid under pressure to said supply bore and exhaust means to exhaust fluid from said exhaust bore;
  (e) a plurality of annular supply ports each formed as a groove in said valve element connected to said supply bore to provide selective connections to said controlled ports and each supply port having substantially balanced areas located on opposite sides of a first transverse axis substantially through said supply bore and exhaust bore and substantially balanced areas on opposite sides of a second transverse axis located perpendicular to and at the center of said first transverse axis;
  (f) said valve element at said supply ports having a section with material located along said first transverse axis on both sides of said supply bore and exhaust bore adjacent the perimeter of said valve element;
  (g) and exhaust ports in said valve element connected to said exhaust bore and selectively connecting said controlled ports to exhaust in selected valve positions.

4. In a valve assembly;
  (a) a valve body having a bore with a controlled port;
  (b) a valve element reciprocally mounted for movement to a plurality of positions in said bore;
  (c) said valve element having a supply bore closed at both ends;
  (d) said valve body and element having means for supplying fluid under pressure to said supply bore;
  (e) a supply port formed as a groove in said valve element connected to said supply bore to provide a selective connection to said controlled port and said supply port having substantially balanced areas located on opposite sides of a first transverse axis substantially through the longitudinal axis of said supply bore and substantially balanced areas on opposite sides of a second transverse axis located perpendicular to and at the center of said first transverse axis;

(f) and said valve element at said supply port having a section with material located adjacent each end of said first transverse axis on opposite sides of said supply bore sufficient to prevent any deflection by any small force unbalance that may be present.

5. In a valve assembly;

(a) a valve body having a bore with a controlled port;
(b) a valve element reciprocally mounted for movement to a plurality of positions in said bore;
(c) said valve element having a supply bore closed at both ends;
(d) said valve body and element having means for supplying fluid under pressure to said supply bore;
(e) a supply port formed as a groove in said valve element connected to said supply bore to provide a selective connection to said controlled port and said supply port having substantially balanced areas located on opposite side walls of the groove to substantially balance the axial forces due to fluid pressure in said supply port;
(f) and said valve element at said supply port having a central connecting section with material located adjacent each end of a transverse axis through said supply bore sufficient to prevent any deflection by any small force unbalance.

6. In a valve;

(a) a valve body having a long bore with a plurality of controlled ports;
(b) a long valve element reciprocally mounted for movement to a plurality of positions in said bore and having a plurality of supply ports;

(c) said valve element having an axial supply bore closed at both ends and an axial exhaust bore;
(d) said valve body and element having means for supplying fluid under pressure from said source to said supply bore and exhausting fluid from said exhaust bore;
(e) supply ports formed as grooves in said valve element connected to said supply bore to provide a selective connection to selected pairs of said controlled ports and said supply ports having substantially balanced areas located on opposite sides of a first transverse axis through the axis of said supply bore and substantially balanced areas on opposite sides of a second transverse axis located perpendicular to and at the center of said first transverse axis;
(f) said valve element at said supply ports having a section with material located adjacent each end of said first transverse axis sufficient to prevent any deflection by any small force unbalance;
(g) and exhaust ports connecting in each valve position all but the selected pair of controlled ports to said exhaust bore.

References Cited by the Examiner

UNITED STATES PATENTS 2,978,928  4/61  Tuck et al. _____ 74—645
3,004,555  10/61  Haberland _____ 137—625.68

M. CARY NELSON, *Primary Examiner.*

MARTIN P. SCHWADRON, ISADOR WEIL,
*Examiners.*